United States Patent
Betancourt et al.

(10) Patent No.: US 12,380,167 B1
(45) Date of Patent: Aug. 5, 2025

(54) SYSTEMS AND METHODS FOR REDUCING USAGE OF CACHE MEMORY IN CONNECTION WITH USER QUERIES

(71) Applicant: Capital One Services, LLC, McLean, VA (US)

(72) Inventors: Pedro Betancourt, McKinney, TX (US); Mia Frederick, The Colony, TX (US); Preetha Veeraraghavan, Plano, TX (US); Johnny Nguyen, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/430,402

(22) Filed: Feb. 1, 2024

(51) Int. Cl.
*G06F 16/903* (2019.01)

(52) U.S. Cl.
CPC .................. *G06F 16/903* (2019.01)

(58) Field of Classification Search
None
See application file for complete search history.

(56) References Cited

U.S. PATENT DOCUMENTS

| | | | |
|---|---|---|---|
| 7,849,185 B1* | 12/2010 | Rockwood | G06F 16/903 |
| 10,664,508 B1* | 5/2020 | Laurence | G06F 16/9035 |
| 2005/0240570 A1* | 10/2005 | Ozbutun | G06F 16/24539 |
| 2010/0010965 A1* | 1/2010 | Edlund | G06F 16/2425 |
| | | | 707/E17.014 |
| 2010/0287175 A1* | 11/2010 | Beaudreau | G06F 16/9538 |
| | | | 707/769 |
| 2020/0364222 A1* | 11/2020 | Sarapuk | G06F 16/24539 |
| 2024/0086489 A1* | 3/2024 | Sachindran | G06F 16/9574 |

* cited by examiner

*Primary Examiner* — Son T Hoang
(74) *Attorney, Agent, or Firm* — Foley & Lardner LLP

(57) ABSTRACT

In some embodiments, reducing usage of cache memory in connection with user queries may be facilitated. In some embodiments, in connection with a first query, (i) a first set of results received during a user session and (ii) a first output generated from the first set of results are stored in a session cache associated with the user session. In response to determining that a second query parameter of a second query corresponds to a first query parameter of the first query but fails to satisfy a match criterion: a cache lookup is performed on the session cache to retrieve a matching result subset of the first set of results, in lieu of retrieving the first output generated from the first set of results, where the matching result subset does not include a result corresponding to the first query parameter. A second output is then generated.

20 Claims, 6 Drawing Sheets

SYSTEMS AND METHODS FOR REDUCING USAGE OF CACHE MEMORY IN CONNECTION WITH USER QUERIES

SUMMARY

Methods and systems are described herein for improvements related to reducing cache memory usage. As one example, methods and systems are described herein for reducing usage of cache memory in connection with user queries.

Existing caching solutions rely on an "all or nothing" approach when caching available data. For example, in the context of client-side web caching involving queries, a client device may transmit a request to one or more remote servers that are configured to receive a subset of query parameters. Each remote server may provide a response (e.g., a result) that corresponds to a respective subset of the query parameters, and the client device may cache the received results as a single result. In this way, when an identical request is made from the client device, the client device may retrieve the single result from the cache to prevent undue network traffic when requesting identical result data from the remote servers and re-caching the identical result. However, when a new request is made (e.g., with at least one different query parameter), the client device may perform a cache lookup to verify whether the result exists within the cache. Upon determining that the result does not exist (e.g., due to the new request having at least one different query parameter), the system is required to request new result data from the remote servers and cache the new result data.

While using this "all or nothing" approach is intuitive, such "all or nothing" approach lacks efficiency as these existing solutions do not account for minor variations within requested data. For example, given that a single query may include a set of query parameters, and subsets of the query parameters may be provided to intended remote servers for a unique response, when a new query is submitted and only one of the parameters has changed, existing solutions must cache the entirety of the responses as a single response received from the remote servers (e.g., a combined result, where the individual results are not accessible individually) as opposed to simply caching only those results that have changed and not caching the results that are not impacted by the changed query parameter. That is, existing solutions do not have a mechanism for determining which set of query results to cache in view of the query parameters themselves. Without such mechanism, cache memory is thereby wasted as both the new result data and the previously cached, identical result data is cached.

Moreover, not only may cache memory be wasted when implementing the "all or nothing" approach, but computational resources are also wasted when performing cache lookups. For example, existing solutions perform cache lookups each time that a request is made. That is, irrespective of whether a request has changed, the existing solutions may nonetheless perform a cache lookup to search for results even when no result exists within the cache. This wastes a multitude of processing cycles as the client device must parse through the cache memory attempting to find results that do not exist. When the client device determines that no result exists, only then will the client device request new response data from the servers.

Further exacerbating this issue is when the received results are used to generate an intended output. For example, when a query is presented, the remote servers may provide the query results and the query results may be combined to generate an output (e.g., a search result, information from a database, a combined value, etc.). Existing solutions will additionally cache the output that is based on the query parameters/the query results to obtain the output in the future to reduce network traffic. As such outputs are dependent on the query results themselves, new queries typically produce differing outputs. However, existing solutions may nonetheless perform cache lookups in an attempt to retrieve these outputs without regard to whether they exist, further wasting valuable computer processing power.

To overcome these technical challenges described above, in some embodiments, cache memory usage may be reduced. For example, in response to determining that a subsequent query parameter of a subsequent query (e.g., a new query) is for a same attribute as an initial query parameter but fails to match the initial query parameter, the system may perform a cache lookup to retrieve a matching result subset of an initial set of query results in lieu of retrieving a first output generated from the initial set of query results. As discussed above, existing solutions currently implement the "all or nothing" approach irrespective of query parameters (e.g., input parameters for a request) themselves. Rather, the existing solutions merely cache a set of results (e.g., received from remote servers) together as one result without considering how each result itself may be impacted due to variations of query parameters themselves. These existing solutions thereby leave the individually received results inaccessible for retrieval as they are cached together as a combined result for future retrieval. As such, existing solutions may waste valuable cache memory by caching both new and identical data (e.g., as the results are cached as a single result), while wasting computational resources by performing cache lookups for data that changes with respect to input parameters (e.g., query parameters) themselves.

However, by (i) caching query results and (ii) determining which query parameters of a query have been modified, the system can reduce cache memory usage by performing cache lookups for the retrieval of query results that are not modified (e.g., based on the query parameters themselves) in lieu of for outputs or other query results that are modified (e.g., due to modifications to the query parameters themselves). That is, as opposed to performing cache lookups based on (i) the query results or (ii) outputs, the system provides a unique mechanism for basing query lookups on the query parameters themselves, thereby conserving computational resources and reducing cache memory usage.

In some embodiments, a first set of results during a user session in connection with a first query may be received. For example, a user may submit a query within a web session and a set of query results may be received that is based on the user-submitted query. The system may store (i) the first set of results and (ii) a first output generated from the first set of results in the session cache. Subsequent to storing the first set of results, the system may receive a second query during the user session. For example, the second query may be a newly received query. The system may then determine whether a second query parameter of the second query corresponds to a first query parameter of the first query but fails to satisfy a match criterion. For instance, the system may determine whether a query parameter of the second query (i) is for a same attribute as a first parameter of the first query but (ii) fails to match the first parameter of the first query.

If the query parameter of the second query (e.g., the newly received query) is for the same attribute as a given parameter of the first query but fails to match the given parameter (e.g., where the attributes are the same but the values differ), then the system may perform a cache lookup on the session cache to retrieve a matching result subset of the first set of results in lieu of retrieving the first output generated from the first set of results. For example, the system may not only detect whether query parameters have changed but also which query parameters have changed. As discussed above, since query parameters ultimately affect the returned query results and generated outputs, the system may leverage this information to limit cache lookups to retrieve query result subsets that are not impacted by the modified query parameters and forgo cache lookups for query result subsets and outputs that are impacted by the modified query parameters, thereby conserving computer processing power utilized in connection with performing cache lookups.

The system may then generate a second output based on (i) the matching result subset of the first set of results and (ii) a second result received in connection with the second query. For example, the second result may be a new query result that is based on the query parameter of the second query (e.g., the newly received query) that was for the same attribute as the given parameter of the first query but fails to match the given parameter (e.g., where the attributes are the same but the values differ). The second result and the second output may then be stored in the session cache for later retrieval. By doing so, the system provides a further advantage over existing solutions by reducing cache usage as duplicate information is not re-cached as a single result, but rather as result subsets/segments that correspond to respective query parameters. In this way, for example, a reduced amount of information is stored in the session cache by storing information in a segmented fashion that corresponds to query parameter subsets as opposed to in a combined result or output.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
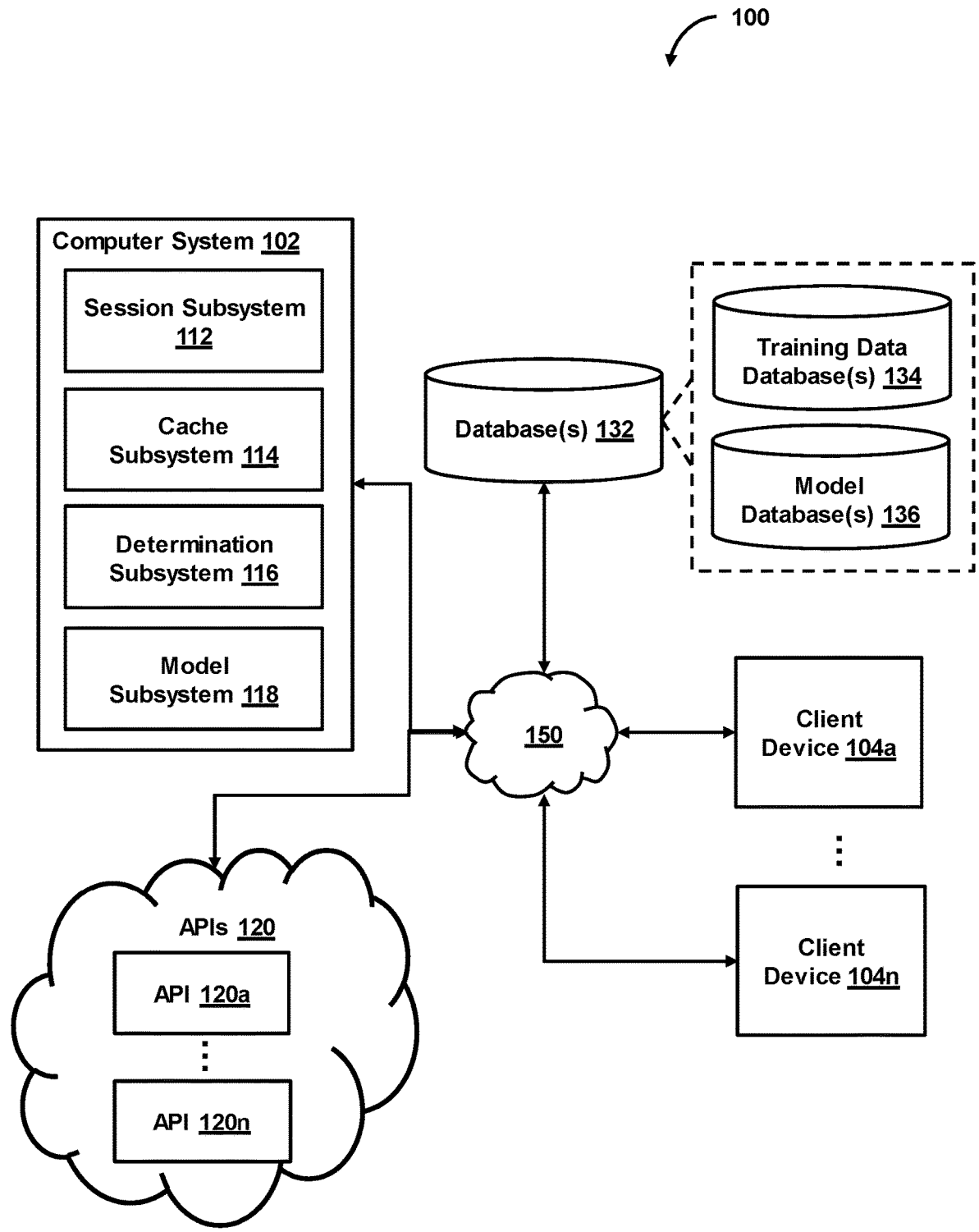
FIG. 1 shows a system for reducing usage of cache memory in connection with user queries, in accordance with one or more embodiments.

FIG. 1 shows a system 100 for reducing usage of cache memory in connection with user queries, in accordance with one or more embodiments. As shown in FIG. 1, system 100 may include computer system 102, client device 104 (or client devices 104a-104n), Application Programming Interfaces Application Programming Interfaces (APIs) 120, or other components. Computer system 102 may include session subsystem 112, cache subsystem 114, determination subsystem 116, model subsystem 118, or other components. APIs 120 may include API 120a-120n. APIs 120 may include one or more remotely accessible APIs (e.g., API 120a-120n). Each API 120 may be accessible via network 150 by computer system 102 or client device 104. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. For instance, although the subsystems of computer system 102 (e.g., session subsystem 112, cache subsystem 114, determination subsystem 116, and model subsystem 118) are shown as being implemented within computer system 102 that can be remote from client device 104, it should be noted that such subsystems can be implemented on client device 104, in accordance with one or more embodiments. It should also be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may reduce usage of cache memory in connection with user queries based on determining that a second query parameter of a second query corresponds to a first query parameter of a first query but fails to satisfy a match criterion. As an example, when the second query parameter of the second query corresponds to the first query parameter of the first query but fails to satisfy the match criterion, system 100 may perform a cache lookup to retrieve a result subset of a first set of results in lieu of retrieving a first output generated from the first set of results.

For example, the second query may be a subsequently received query with respect to an initially received query. System 100 may determine whether a second query parameter of the subsequently received query corresponds to a first query parameter of the initially received query but fails to satisfy a match criterion. If the second query parameter of the subsequently received query corresponds to the first query parameter but fails to satisfy the match criterion, system 100 may then perform a cache lookup on a session cache to retrieve a matching result subset of a first set of results (e.g., received based on the initial query) in lieu of retrieving a first output generated from the first set of results. In this way, the system may reduce cache usage by retrieving results that correspond to unmodified query parameters as opposed to existing systems' reliance on providing undue calls to remote servers and caching duplicate information. If, however, the second query parameter of the subsequently received query corresponds to the first query parameter and satisfies the match criterion, system 100 may then perform a cache lookup on the session cache to retrieve the first output generated from the first set of results in lieu of generating a second output based on the initial set of query results. In this way, the system may reduce the amount of computer processing cycles required to generate an output based on a set of data by forgoing the generation of such output.

In some embodiments, system 100 may receive a first set of results during a user session in connection with a first query. For example, the first set of results may be an initial set of query results received from one or more remote servers, APIs, computing devices, or other resources in response to providing an initial query to the respective component(s). System 100 may store (i) the first set of results and (ii) a first output generated from the first set of results in a session cache associated with the user session. For instance, the user session may be a web session (e.g., a time period in which one device communicates over the internet with a website, server, or other device), which may be associated with a session cache. For example, the session cache may be a browser cache that is accessible during the session.

Subsequent to storing the first set of results, system 100 may receive a second query during the user session. For example, the second query may be a subsequently received query that includes a second set of query parameters. System 100 may determine whether a second query parameter of the second query corresponds to a first query parameter of the first query but fails to satisfy a match criterion. For instance, system 100 may determine whether a second query parameter of the subsequently received query is for a same attribute as the first query parameter of the first query but fails to satisfy a match criterion (e.g., the same attribute but different values). Upon determining that the second query parameter corresponds to the first query parameters but fails to satisfy the match criterion, system 100 performs a cache lookup on the session cache to retrieve a matching result subset of the first set of results in lieu of retrieving the first output generated from the first set of results, where the matching result subset does not include a result corresponding to the first query parameter. As opposed to existing systems that merely rely on performing cache lookups for query results each time a query is received, thereby wasting valuable computational resources, system 100 may base such decision on the query parameters themselves.

For instance, as query results depend on query parameter subsets within a query (e.g., each query result being generated based on one or more query parameters of a set of query parameters), system 100 may determine whether to perform a cache lookup based on whether the query parameters have changed with respect to newly received queries. This reduces the amount of computational resources (e.g., computer processing power) required when searching for data within cache memory as the cache is accessed when such query parameters have been modified. Furthermore, system 100 reduces the usage of the cache itself by retrieving matching result subsets. For example, as opposed to existing systems that only consider the query results (e.g., and not the query parameters) and unnecessarily cache duplicated data, system 100 reduces cache usage as duplicate information is not re-cached as a single result, but rather as result subsets/segments that correspond to respective query parameters. As such, system 100 provides a mechanism to retrieve result subsets that have not been modified with respect to a given query (e.g., based on the query parameters themselves) and enable new outputs to be generated based on (i) newly received results from new queries and (ii) previously stored result subsets.

For example, system 100 may generate a second output based on (i) the matching result subset of the first set of results and (ii) a second result received in connection with the second query. The second result may be a newly received result based on the second query. For example, where the second query includes a new query parameter that is different from that of the first query, system 100 may receive a second query result based on the new query parameter. System 100 may generate a second output using (i) the second query result and (ii) the matching result subset of the first set of results. By doing so, system 100 reduces cache usage by relying on previously cached elements and new results as opposed to re-caching (and re-receiving) duplicated query results of existing systems' "all or nothing" approach.

Subsystems 112-118

In some embodiments, session subsystem 112 may receive a first set of results. For example, session subsystem 112 may receive a first set of query results during a user session in connection with a first query. The first set of query results may be an initial set of query results that are received in response to an initial user-specified query during a user session. For example, the user session may be a web browsing session where a user is communicating with a website or other remote device (e.g., a remote server, remote computing device, etc.). The user may use a user device (e.g., client device 104) to communicate with a web server during a web browsing session and may transmit a first query (e.g., an initial query).

Figure 2A:
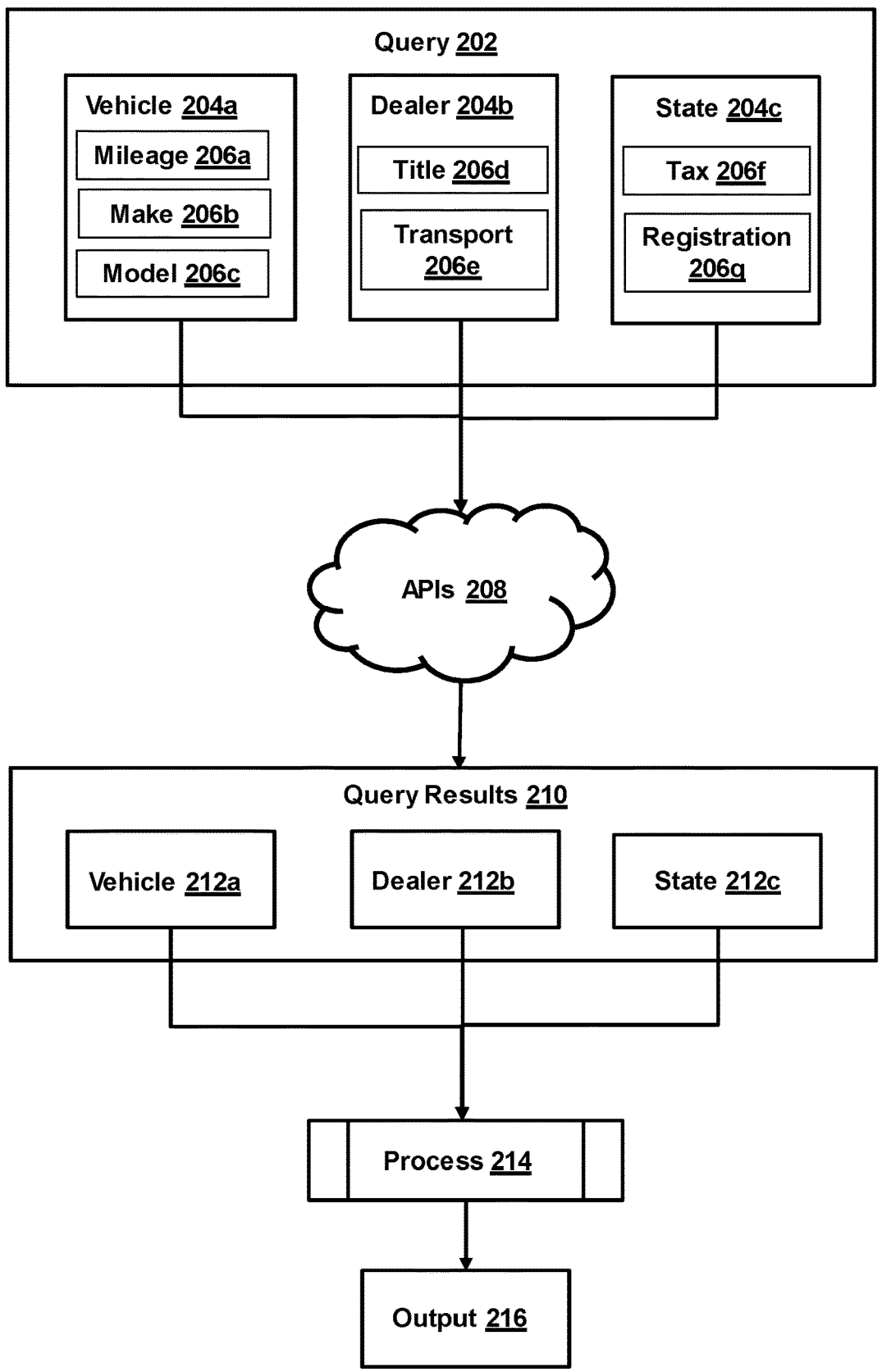
FIGS. 2A-2C show an illustrative diagram of reducing cache memory usage, in accordance with one or more embodiments.

In one use case, referring to FIG. 2A, which shows an illustrative diagram of reducing cache memory usage, and where the website is a vehicle search engine and the user is searching for a vehicle, the user may submit a first query 202 to the website (e.g., via API 208) that includes a set of query parameters. For example, the set of query parameters may specify a vehicle make, a model, a year, mileage, a dealer, a dealer location, an address (e.g., of the dealer), a request for tax fees, a request for registration fees, a request for title fees, a request for transport fees, or other parameters. Each query parameter may be part of a parameter set 204. For example, first query parameter 206a, second query parameter 206b, and third query parameter 206c may be part of first parameter set 204a; fourth query parameter 206d and fifth query parameter 206e may be part of second parameter set 204b; and sixth query parameter 206f and seventh query parameter 206g may be part of third parameter set 204c. Thus, first query 202 may include parameter sets 204, which further include individual parameters 206. Such parameter sets 204 may be based on a query format, structure, or predefined grouping. The user may submit first query 202 to the website (e.g., via API 208), where each parameter set 204 is provided to a respective API of APIs 208. For example, where APIs 208 is the same as or similar to APIs 120 (FIG. 1), APIs 208 may include API 120a-120n. By doing so, each parameter set 204 may be provided to a respective API configured for returning a given query result based on a respective parameter set 204. In response to providing first query 202 to APIs 208, a first set of query results 210 may be received, where each query result 212a-212c corresponds to a respective parameter set 204a-204c. For example, first query result 212a may correspond to first parameter set 204a, second query result 212b may correspond to second parameter set 204b, and third query result 212c may correspond to third parameter set 204c.

Referring back to FIG. 1, cache subsystem 114 may store (i) the first set of results received during the user session in a session cache associated with the user session and (ii) a first output generated from the first set of results in the session cache associated with the user session. For example, in response to receiving an initial set of query results (e.g., first set of query results 210), which include first query result 212a, second query result 212b, and third query result 212c (FIG. 2A), based on an initial query (e.g., first query 202 (FIG. 2A)), the system may store the initial set of query results received during the web session in a session cache associated with the web session. For example, cache subsystem 114 may store the initial set of query results in a web browser cache during the web browsing session. It should be noted, however, that a web browsing session and the web browser cache are merely exemplary, and that the first set of results and the first output may be stored in other caches, such as, but not limited to, a proxy server cache, content delivery network (CDN), reverse proxy, web server cache, internet service provider (ISP) cache, L1, L2, or L3 cache, or other caches.

The first output may be generated based on the first set of results. For example, the first output may be any output that is based the first set of results. In the context of a vehicle search engine, where the vehicle search engine provides an overall price of a vehicle and the query results indicate a price that is associated with a respective parameter set, the first output may add the prices specified in the query results to provide an overall vehicle price. By storing the first set of results and the first output in the session cache associated with the user session, the system (i) may reduce the amount of network traffic experienced over network 150 (e.g., as such results and outputs may be retrieved within a local cache as opposed to transmitting a redundant request for results or outputs) and (ii) may reduce lag associated with obtaining such results and outputs.

Figure 2B:
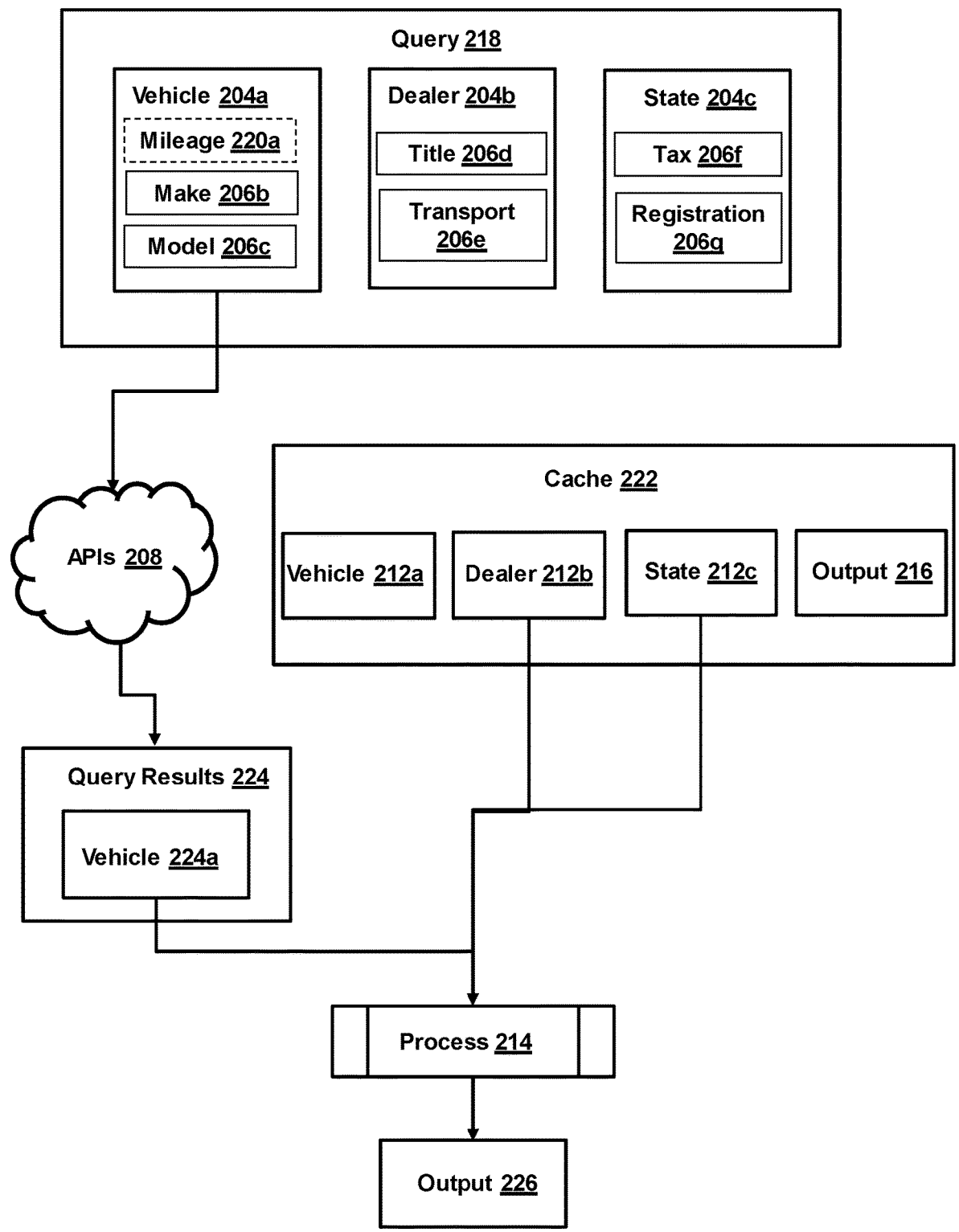

Referring back to FIG. 2A, upon receiving a first set of query results 210, cache subsystem 114 (FIG. 1) may store (i) the first set of query results 210 and (ii) first output 216 in a cache. For example, although not shown in FIG. 2A, the cache may be a cache that is the same as or similar to cache 222 (FIG. 2B). Cache 222 may be a web browser cache or other cache, in accordance with one or more embodiments. First output 216 may be an output that is based on the first set of query results 210. For instance, first output 216 may be generated based on the first set of query results 210 (e.g., first query result 212a, second query result 212b, third query result 212c, etc.) via process 214. For example, session subsystem 112 (FIG. 1) may generate the first output 216.

In the context of providing an overall vehicle price based on a vehicle search engine, the first set of query results may specify prices associated with one or more vehicles. For example, first query result 212a may indicate a base price of a vehicle, second query result 212b may indicate a price of dealer fees associated with a vehicle, and third query result 212c may indicate state fees associated with a vehicle. Process 214 may be any output function that produces an output. For example, process 214 may sum, multiply, divide, or subtract combinations of the values (e.g., prices) indicated in the first set of query results 210 to generate first output 216 (e.g., an overall vehicle price for the vehicle). Cache subsystem 114 may then store the first output 216 in the cache (e.g., cache 222 (FIG. 2B)). It should be noted that, although components of FIGS. 2A-2C may involve concepts of providing an overall price of a vehicle, other use cases exist that are not limited to providing a price of an object and that any output generated via one or more processes based on received query results may be effectuated, in accordance with one or more embodiments. Furthermore, it should be noted that process 214 may act in the same way or similar ways with respect to FIGS. 2A-2C, albeit with other inputs to generate other outputs (e.g., new output 226 (FIG. 2B)).

Referring back to FIG. 1, subsequent to storing the first set of results, session subsystem 112 may receive a second query. For example, subsequent to storing the first set of query results (or the first output), session subsystem 112 may receive a second query during the user session. For instance, the second query may be a second user-specified query, which may include a second set of query parameters.

In one use case in the context of vehicle search engines, the user may submit a second query. For example, the second query may include the same or similar set of query parameters as the first query. Referring to FIG. 2B, which shows an illustrative diagram of reducing cache memory usage, a second query 218 may be received. Second query 218 may include the same or similar query parameters as first query 202. For instance, second query 218 may be subsequently received with respect to the first query 202 during a web browsing session. In this example, each of query parameter sets 204a, 204b, and 204c of second query 218 correspond to the query parameter sets 204a, 204b, and 204c of the first query 202. Likewise, each query parameter 206 of second query 218 corresponds to its respective query parameter 206 of first query 202; however, first query parameter 206a of first query 202 is modified as eighth query parameter 220a. For example, different from the first query 202, the user may adjust the second query to include a different value for the mileage of the vehicle (e.g., eighth query parameter 220a). For instance, first query parameter 206a may have indicated a vehicle with less than 3,000 miles, and eighth query parameter 220a may indicate a vehicle with less than 10,000 miles.

Referring back to FIG. 1, determination subsystem 116 may determine whether a second query parameter of the second query corresponds to a first query parameter of the first query but fails to satisfy a match criterion. For example, determination subsystem 116 may monitor queries when they are received. As an example, determination subsystem 116 may store query parameters of queries received from session subsystem 112 to enable query parameters to be retrieved for later use. Determination subsystem 116 may store such query parameters in a storage local to a respective device (e.g., computer system 102, client device 104a, or other device). When queries are received (e.g., during the user session, web session, etc.), determination subsystem 116 may determine whether any query parameters of a newly received query (e.g., the second query) correspond to a query parameter of a previously received query (e.g., the first query). Query parameters may correspond to each other when the query parameters are for the same attribute. For example, a query parameter may include an attribute for "Make" of a vehicle, and an attribute value (or simply, a value) of "Ford." Therefore, a query parameter may comprise an attribute and value pair.

The match criterion, or match criteria, may be any match criteria that indicates a matching between values, a likelihood that a query parameter is likely to be modified, criteria that indicates whether to cache query results associated with query parameters, criteria that indicates whether to perform cache lookups to retrieve query results, criteria that indicates whether to perform cache lookups to retrieve outputs, or other match criteria, as described herein. As one example, determination subsystem 116 may determine whether a second query parameter of a second query (e.g., a subsequent query, a newly received query, etc.) corresponds to a first query parameter of a first query (e.g., an initial query, a previously received query, etc.). Upon determining that the second query parameter of the second query corresponds to the first query parameter of the first query, determination subsystem 116 may determine whether the second query parameter of the second query satisfies a match criterion with respect to the first query parameter of the first query. For example, determination subsystem 116 may determine whether the second value associated with the second query parameter matches the first value associated with the first query parameter. For instance, the first query parameter may be for an attribute of a vehicle make, and the value for the vehicle make attribute may be "Ford," and the second query parameter may be for an attribute of a vehicle make, and the value for the vehicle make attribute may be "Ford." That is, a first query may specify a query parameter of "Make: Ford" where "Make" is the attribute, and "Ford" is the value for the attribute. The second query may specify a query parameter of "Make: Ford" where "Make" is the attribute and "Ford" is the value for the attribute. Determination subsystem 116 may determine that the query parameters of the first and second query correspond to each other (e.g., as they are for the same attribute). In some embodiments, determination subsystem 116 may compare each query parameter of each of the first and second queries to determine corresponding query parameters.

Determination subsystem 116 may then determine, for the corresponding query parameters of the first and second queries, whether the match criterion is satisfied. Continuing with the example above, as each of the first and second query parameters corresponds to one another and each has matching attribute (e.g., parameter) values, determination subsystem 116 determines that the match criterion is satisfied based on the matching values (e.g., of "Ford"). In response to determining that the second query parameter of the second query corresponds to the first query parameter of the first query but fails to satisfy the match criterion, determination subsystem 116 may cause cache subsystem 114 to perform a cache lookup on the session cache to retrieve the first output generated from the first set of results, in lieu of generating a second output based on the first set of results. In this way, the system may reduce the amount of computational resources required to generate previously stored results.

However, if the first query parameter has an attribute value of "Ford," and the second query parameter has an attribute value of "Tesla," then determination subsystem 116 may determine that the match criterion is not satisfied (e.g., fails to satisfy the match criterion). In response to determining that the second query parameter of the second query corresponds to the first query parameter of the first query but fails to satisfy the match criterion, determination subsystem 116 may cause cache subsystem 114 to perform a cache lookup on the session cache to retrieve a matching result subset of the first set of results, in lieu of retrieving the first output generated from the first set of results. The matching result subset may not include a result corresponding to the first query parameter. For instance, as opposed to existing systems' reliance on an "all or nothing" approach when retrieving cached results (e.g., retrieving all cached results in connection with a query, or retrieving none of the cached results in connection with a query), the system may reduce cache usage while reducing network traffic by retrieving matching result subsets. For example, as existing systems may store multiple query results and any corresponding outputs together as a single block of data, where the individual query results/outputs are unable to be retrieved individually, the system may retrieve matching result subsets (e.g., the individual query results themselves) to prevent the need to (i) re-cache pre-existing data and (ii) request duplicate query results from respective APIs or servers. Even if existing systems store such query results in a cache individually as opposed to a single block of data, existing systems still fail to provide a mechanism to determine whether to perform cache lookups based on the query parameters themselves of a query or retrieve any matching result subsets that correspond to unmodified query parameters of one or more queries. As such, the system provides several advantages over existing caching solutions to reduce cache usage while reducing network traffic over computing networks.

As an illustrative example, referring to FIG. 2B, determination subsystem 116 may determine that eighth query parameter 220a of a second query 218 (e.g., a subsequently query) corresponds to first query parameter 206a of first query 202 (FIG. 2A). Determination subsystem 116 may then determine whether eighth query parameter 220a satisfies the match criterion. For example, determination subsystem 116 may compare the attribute values of the eighth query parameter 220a and the first query parameter 206a to each other. As shown in this example, the eighth query parameter 220a may be for an attribute of "Mileage" and may have an attribute value of 6,000 miles (e.g., "Mileage: 6,000"). The first query parameter 206a may also be for an attribute of "Mileage" and may have an attribute value of 2,000 miles (e.g., "Mileage: 2,000"). Determination subsystem 116 may determine that eighth query parameter 220a fails to satisfy the match criterion as the attribute values between the first query parameter 206a and the eighth query parameter 220a fail to match. In response to determination subsystem 116 determining that the second query parameter (e.g., eighth query parameter 220a) of the second query (second query 218) fails to satisfy the match criterion, determination subsystem 116 may cause cache subsystem 114 to perform a cache lookup on the session cache to retrieve a matching result subset of the first set of results in lieu of retrieving the first output generated from the first set of results, where the matching result subset does not include a result corresponding to the first query parameter.

The matching result subset may be a set of results that correspond to unmodified query parameters. For example, a matching result subset may be a set of results that are derived from or received based on unmodified query parameters between two or more queries. As described above, the first parameter set 204a may correspond to first query result 212a, second parameter set 204b may correspond to second query result 212b, and third parameter set may correspond to third query result 212c. Such results may be stored in cache 222 (e.g., session cache or other cache). Cache subsystem 114 may retrieve the matching result subset of the first set of results. Continuing with the example above, cache subsystem 114 may retrieve from cache 222 second query result 212b and third query result 212c, but not first query result 212a. For instance, as determination subsystem 116 has determined that the eighth query parameter 220a fails to satisfy the match criterion, the first query result 212a may not be a matching result that is part of the matching result subset. To clarify, because second query 218 includes a query parameter that has been modified, the system may not rely on the corresponding result from the first query to be retrieved for use. That is, although the first query 202 (FIG. 2A) and the second query 218 each include a first parameter set 204a (e.g., for vehicle), as an attribute value that is part of the first parameter set 204a has been modified (e.g., eighth query parameter 220a) with respect to the second query, the first query result 212a that was previously cached in connection with the first query 202 may not be accurate in view of the modified query parameter of the first parameter set 204a of the second query 218. As such, the session subsystem 112 may then provide the first parameter set 204a of the second query 218, which includes the modified query parameter (e.g., eighth query parameter 220a), to APIs 208 to receive an updated set of query results 224, which may include a new result (e.g., fourth result 224a) that corresponds to the modified query parameter.

Figure 2C:
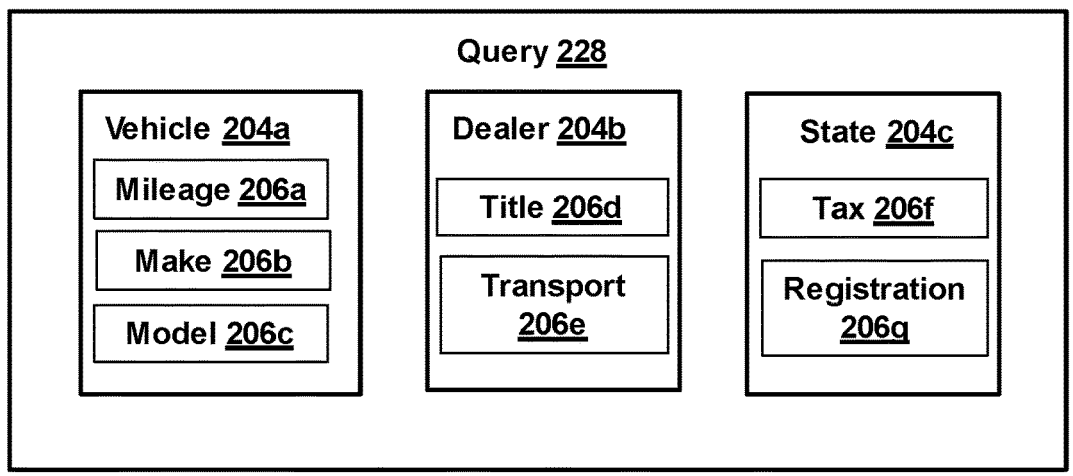
Figure 2C:
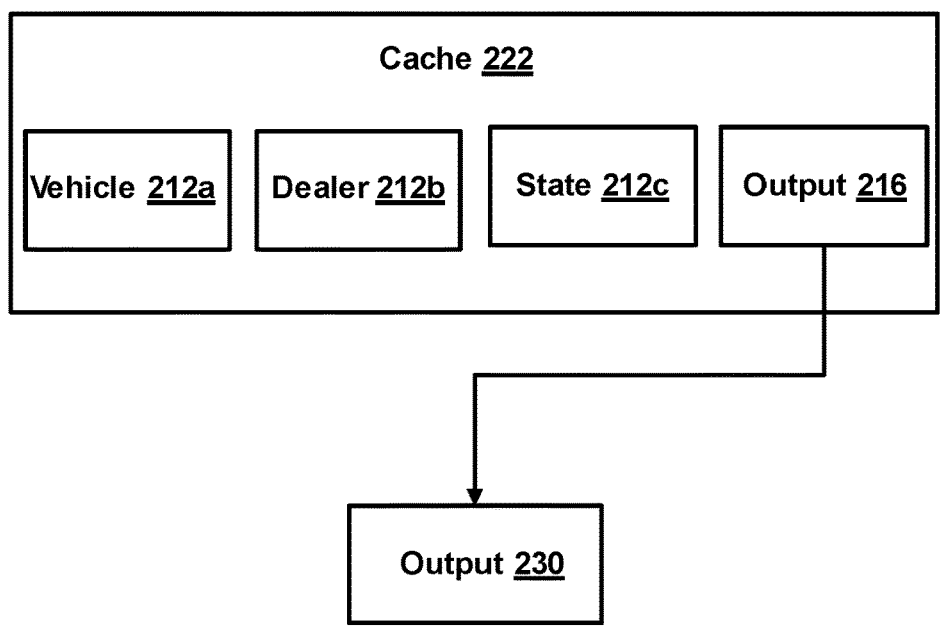

However, in some embodiments, as an illustrative example referring to FIG. 2C, determination subsystem 116 may perform a cache lookup on the session cache to retrieve the first output in lieu of generating an output based on the first set of results. For example, in response to determining that the second query parameter of the second query corresponds to the first query parameter of the first query and satisfies the match criterion, determination subsystem 116 may cause cache subsystem 114 to perform a cache lookup on the session cache to retrieve the first output generated from the first set of results in lieu of generating an output based on the first set of results. For example, where a subsequently received query (e.g., third query 228) does not include any modified attribute values that correspond to a previously received query (e.g., first query 202), cache subsystem 114 may perform a cache lookup on the session cache (e.g., cache 222) to retrieve the first output (e.g., output 216) that is stored in the session cache to be provided as output 230 (e.g., to be provided to a user, to be provided to a computing device, to be displayed on a user interface, etc.). For instance, where the first query 202 (FIG. 2A) is the same query as third query 228 (e.g., indicating that all query parameters between the first query 202 and third query 228 (i) correspond to one another and (ii) have the same attribute values for each corresponding query parameters), then cache subsystem 114 may retrieve the previously generated output (e.g., output 216) that was generated based on the first set of results (e.g., first query result 212a, second query result 212b, and third query result 212c) of the first query. In this way, the system may conserve computational resources by accessing previously calculated and stored outputs from the session cache.

In some embodiments, referring back to FIG. 1, determination subsystem 116 may access a configuration profile indicating matching criteria to determine whether the second query parameter of the second query fails to satisfy the match criterion. For example, determination subsystem 116 may access a configuration profile indicating matching criteria that indicates whether to cache query results associated with query parameters. The configuration profile may be stored in a storage (e.g., memory, database, etc.) of databases 132. Determination subsystem 116 may access the configuration profile based on the second query parameter to determine whether the second query parameter corresponds to a matching criteria that indicates to not cache query results associated with the second query parameter.

For example, where a query is newly received (e.g., second query 218 (FIG. 2B)), determination subsystem 116 may access the configuration profile to determine whether a query parameter of the newly received query corresponds to a matching criteria indicating an instruction to not cache a query result that is based on the query parameter of the newly received query. For instance, when a query is newly received, the system may transmit respective query parameters of the new query to one or more APIs to receive a query result. However, to conserve cache usage, the system may determine, based on the configuration profile, whether a newly received query parameter will cause the storage of the query result in the session cache. For instance, as some query parameters often change with respect to user-submitted queries while others do not, the system may conserve cache usage by preventing the storage of cache results that are returned with respect to query parameters that likely change. In this way, the system reduces cache usage by storing cache results that are unlikely to change with respect to future queries.

The configuration profile may indicate matching criteria that indicates whether to cache query results that are associated with query parameters. Such matching criteria may be in the form of an alphanumeric character, a string (e.g., "Yes," "No"), an integer (e.g., where 0 indicates to cache a query result, where 1 indicates to not cache a query result, etc.), or other format.

For example, in the context of vehicle financing, a user may submit a query indicating query parameters of "Make: Ford, Model: F-150, State: Virginia." The configuration profile may indicate that for a query parameter of "Model" the system should not cache query results associated with the query parameter of "Model" (e.g., as users searching for vehicles are likely to change the model parameter). However, the configuration profile may indicate that for the query parameters of "Make" and "State," the system should cache query results associated with such query parameters. Therefore, when the system provides such query parameters to APIs (or other systems to return a query result), the system may store query results that correspond to the "Make" and "State" query parameters, but not the "Model" query parameter, thereby conserving cache usage. In response to determining that the second query parameter corresponds to the matching criteria indicating to not cache query results associated with the second query parameter, determination subsystem 116 may determine that the second query parameter of the second query fails to satisfy the match criteria.

In some embodiments, the system may determine that the second query parameter of the second query fails to satisfy the match criterion based on a machine learning model result. For example, determination subsystem 116 may provide the second query parameter to model subsystem 118, where model subsystem 118 may provide the second query parameter to a machine learning model configured to output a result indicating whether query parameters satisfy matching criteria (or criterion). In response to providing the second query parameter to the machine learning model, the system may receive a first result (e.g., from the machine learning model) indicating that the second query parameter fails to satisfy the match criterion.

For instance, as queries may be in differing domains (e.g., vehicle financing applications, search engine applications, database searching, etc.), systems may not have a mechanism that is tailored to specific domains that can indicate whether or not to cache query results based on newly received queries. As such, the system may leverage a machine learning model that is configured to determine whether or not to cache query results of a multiplicity of domains.

As such, model subsystem 118 may access one or more machine learning models for generating results related to whether query parameters satisfy matching criteria. For example, model subsystem 118 may access model database 136 to obtain a machine learning model configured for generating results related to whether query parameters satisfy matching criteria, may access training data database 134 for training data pertaining to training machine learning models to predict whether query parameters satisfy matching criteria, or may access one or more pre-stored/pre-trained machine learning models from model subsystem 118 itself.

In some embodiments, model subsystem 118 may train or configure one or more machine learning models to facilitate one or more embodiments described herein. Such models may be used to generate resource usage predictions for a service. As an example, such models may be trained or configured to perform the foregoing functions by respectively, mutually mapping input data and output data in nonlinear relationships based on learning (e.g., deep learning).

In some embodiments, the machine learning models (otherwise known as prediction models) may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving as compared to traditional computer programs. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 3:
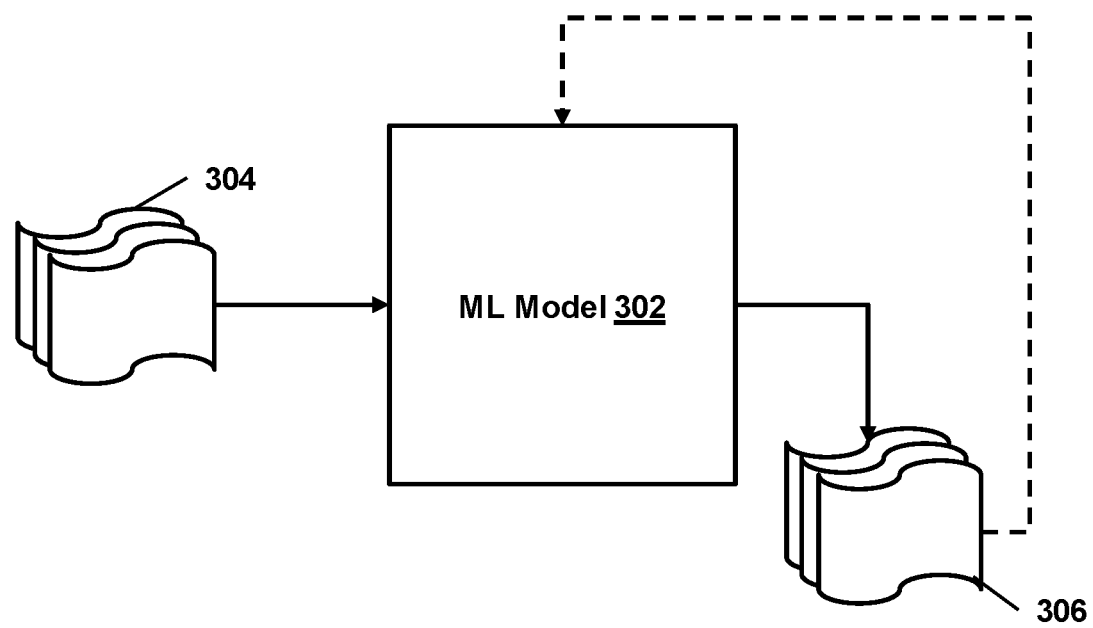
FIG. 3 shows a machine learning model configured for generating match criterion predictions, in accordance with one or more embodiments.

As an example, with respect to FIG. 3, machine learning model 302 may take inputs 304 and provide outputs 306. In one use case, outputs 306 may be fed back to machine learning model 302 as input to train machine learning model 302 (e.g., alone or in conjunction with user indications of the accuracy of outputs 306, labels associated with the inputs, or with other reference feedback information). In another use case, machine learning model 302 may update its configurations (e.g., weights, biases, or other parameters) based on its assessment of its prediction (e.g., outputs 306) and reference feedback information (e.g., user indication of accuracy, reference labels, or other information). In another use case, where machine learning model 302 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent, fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, as referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some embodiments, model subsystem 118 may receive training data to train an artificial intelligence model. For example, model subsystem 118 may receive training data from training data database 134, which may include (i) historical query parameters, (ii) historical matching criteria indicating whether to cache query results associated with the historical query parameters, or (iii) other information. Such training data may be provided as input (e.g., inputs 304) to the artificial intelligence model (e.g., machine learning model 302) during a training routine to train the artificial intelligence model, which may generate outputs 306. Outputs 306 may indicate a result indicating whether a query parameter satisfies matching criteria, a result indicating whether to cache query results associated with a query parameter, or other output. For example, outputs 306 may indicate that a query result should be cached with respect to a query parameter. As other example, outputs 306 may indicate that a query parameter fails to satisfy a match criterion. In some embodiments, outputs 306 may be compared to ground truth data (e.g., a correct output, labels indicating a correct result, etc.) to be provided back to machine learning model 302 as reference feedback information to further train machine learning model 302.

Referring back to FIG. 1, in some embodiments, the cache subsystem 114 may prevent storage of a result. For instance, as opposed to existing caching mechanisms that cache all query results irrespective of their type, the data included therein, or other criteria, cache subsystem 114 may prevent storage of the newly received result. As an example, after determination subsystem 116 determines that the second query parameter of the second query (e.g., the newly received query, the second query, etc.) corresponds to the first query parameter of the first query (e.g., the initial query, the first query, etc.), but fails to satisfy the match criterion, determination subsystem 116 may cause cache subsystem 114 to prevent storage of the newly received result received in connection with the second query during the user session. As such query parameter fails to satisfy the match criterion (e.g., indicating whether or not to cache corresponding query results based on their likelihood of changing or otherwise diverging), cache subsystem 114 may prevent storage, during the user session, of any received query results that are based on the newly received query parameter. For example, referring back to FIG. 2B, an updated set of query results 224, which may include a new result (e.g., fourth result 224a) that corresponds to the modified query parameter.

Additionally, cache subsystem 114 may further prevent the storage of a new output (e.g., output 226) during the user session in the session cache. Similar to the above, where query results are prevented from being stored in the session cache during the user session as query parameters fail to satisfy the match criterion, the output (e.g., of the matching result subset of the first set of results and the new result) may also change when additional queries are received. In this way, the system may conserve cache usage by preventing the storage of query results (and outputs) that are likely to change with respect to subsequently received queries during user sessions. Moreover, by preventing the storage of respective query results during the user session (e.g., when the query parameters of a newly received query correspond to a previously received query parameter but fails to satisfy the match criterion), the system may enhance cache performance by preventing storage of data that is likely to change during a given session without affecting cache performance of other user sessions.

In some embodiments, the cache subsystem 114 may store the new result. For instance, as opposed to existing caching mechanisms that cache all query results irrespective of their type, the data included therein, or other criteria, cache subsystem 114 may store the new result when the match criterion is satisfied. As an example, after determination subsystem 116 determines that the second query parameter of the second query (e.g., the newly received query) corresponds to the first query parameter of the first query (e.g., the initial query) and satisfies the match criterion, cache subsystem 114 may store the new result received in connection with the second query during the user session. For example, as such query parameter satisfies the match criterion (e.g., indicating whether or not to cache corresponding query results based on their likelihood of changing or otherwise diverging), cache subsystem 114 may store the result received in connection with the query result that satisfies the match criterion during the user session. For example, cache subsystem 114 may only store the query result when the newly received query parameter satisfies the match criterion to conserve cache usage (e.g., limiting such storage to only those instances where the match criterion is satisfied).

As an example referring to FIG. 2B, in the case where eighth query parameter 220a satisfies the match criterion (e.g., via the configuration profile, via the machine learning model, etc.) but does not directly match the attribute value for the corresponding query parameter (e.g., first query parameter 206a) of the first query 202, the cache subsystem 114 may nonetheless store the new query result set (e.g., the updated set of query results 224), which may include a new result (e.g., fourth result 224a) in the session cache (e.g., cache 222). Additionally, cache subsystem 114 may further store the newly generated output (e.g., output 226) during the user session in the session cache. Similar to the above, where query results are stored in the session cache during the user session as query parameters satisfy the match criterion, the output (e.g., of the matching result subset of the first set of results and the new result) may be unchanged or may be updated when additional queries are received. Due to the unknown factor involved in such situation as to whether the query results or outputs may be updated in a next query, since the match criterion is satisfied, the system may store the new result and the new output to reduce network traffic calls if the next query is the same or similar query. Furthermore, by storing the query results (or outputs) during the user session (e.g., when the query parameters of a newly received query correspond to a previously received query parameter and also satisfy the match criterion), the system may enhance cache performance by storing data that is unlikely to change during a given session without affecting cache performance of other user sessions.

In some embodiments, session subsystem 112 may extract one or more values associated with the matching result subset of the first set of results and the new result to generate a new output. For example, the new output (e.g., output 226) may be generated based on an output function of process 214. The new output may be generated subsequent to determining whether the match criterion is satisfied. For instance, session subsystem 112 may provide the second query parameter (e.g., eighth query parameter 220a) to an API (e.g., APIs 208). The API may process the second query parameter to generate a new result (e.g., a second query result, a new set of query results, etc.).

Session subsystem 112 may receive the new result from the API in response to providing the second query parameter (e.g., eighth query parameter 220a) to the API. For example, the new result may include a price of a vehicle with a different mileage with respect to the first query. Session subsystem 112 may then extract one or more values associated with (i) the matching result subset of the first set of results and (ii) the new result. For instance, where the matching result subset of the first set of results include dealers' fees and state fees, the new result may include a price of the vehicle. Session subsystem 112 may extract such values from the (i) matching result subset of the first set of results and (ii) the second result. Session subsystem 112 may then provide the extracted values to an output function to generate the new output (e.g., output 226). For instance, the output function may be a function to calculate the total price of the vehicle (e.g., by summing the extracted values, by multiplying the extracted values, by dividing the extracted values, by subtracting the extracted values, or a combination thereof). By generating the new output based on (i) the matching result subset of the first set of results and (ii) the new result received in connection with the new query, the system may reduce network traffic as the system may leverage previously stored values (e.g., of the matching result subset) from the cache as opposed to calling APIs for pre-existing query results.

Example Flowcharts

Figure 4:
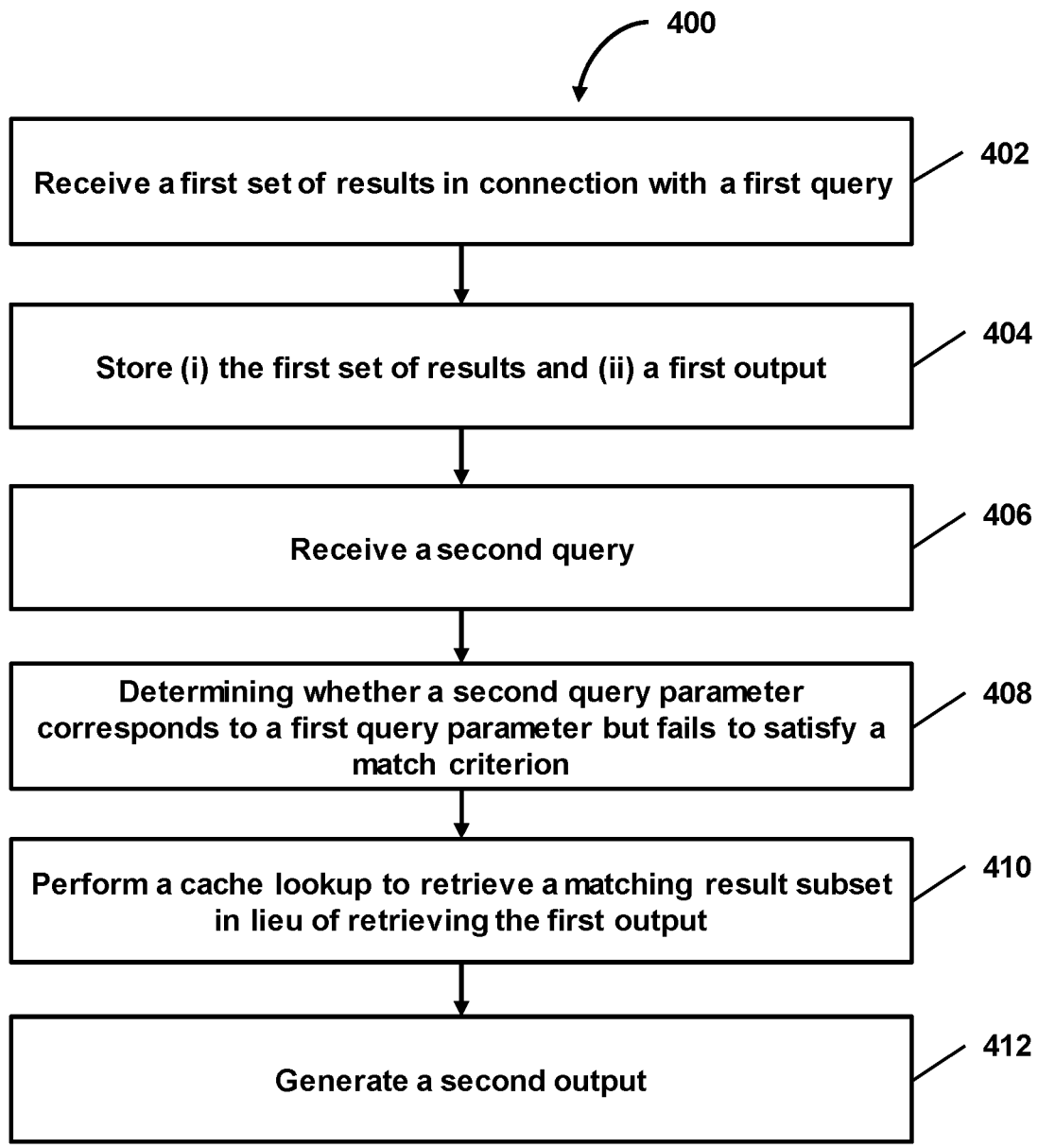
FIG. 4 shows a flowchart of a method for reducing usage of cache memory in connection with user queries, in accordance with one or more embodiments.

FIG. 4 is an example flowchart of processing operations of a method 400 that enable the various features and functionality of the system as described in detail above. The processing operations of the method presented below are intended to be illustrative and non-limiting. In some embodiments, for example, the method may be accomplished with one or more additional operations not described, and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 402, a first set of results may be received in connection with a first query. For example, the system may receive a first set of results during a user session in connection with a first query. The first set of results may be an initial set of query results. The initial set of query results may be received in connection with an initial query. For example, the initial set of query results may be received from one or more remote servers, APIs, or computing devices. Operation 402 may be performed by a subsystem that is the same as or similar to session subsystem 112, in accordance with one or more embodiments.

In an operation 404, (i) the first set of results and (ii) a first output may be stored. For example, the system may store (i) the first set of results received during the user session in a session cache associated with the user session and (ii) a first output generated from the first set of results in the session cache associated with the user session. The system may store the first set of results and the first output in a web session cache or other local/remote cache. Operation 404 may be performed by a subsystem that is the same as or similar to cache subsystem 114, in accordance with one or more embodiments.

In an operation 406, the system may receive a second query. For example, subsequent to storing the first set of results, the system may receive a second query during the user session. Operation 406 may be performed by a subsystem that is the same as or similar to session subsystem 112, in accordance with one or more embodiments.

In an operation 408, the system may determine whether a second query parameter corresponds to a first query parameter but fails to satisfy a match criterion. For example, the system may determine, for each query parameter of the second query, corresponding query parameters of the first query. In response to determining corresponding query parameters, the system may determine, for each corresponding query parameter of the first and second query, whether any query parameter fails to satisfy a match criterion. In some embodiments, in response to determining whether a second query parameter corresponds to a first query parameter but fails to satisfy a match criterion, the system may perform operations 410-412 (or variations of operations 410-412 thereof). Operation 408 may be performed by a subsystem that is the same as or similar to determination subsystem 116, in accordance with one or more embodiments.

In an operation 410, a cache lookup to retrieve a matching result subset in lieu of retrieving the first output may be performed. For example, the system may perform a cache lookup on the session cache to retrieve a matching result subset of the first set of results in lieu of retrieving the first output generated from the first set of results. The matching result subset may not include a result corresponding to the first query parameter. Operation 410 may be performed by a subsystem that is the same as or similar to cache subsystem 114, in accordance with one or more embodiments.

In an operation 412, a second output may be generated. For example, the system may generate a second output based on (i) the matching result subset of the first set of results and (ii) a second result received in connection with the second query. For instance, the second result may be received from one or more APIs, remote servers, or remote computing devices in connection with the second query. Operation 412 may be performed by a subsystem that is the same as or similar to session subsystem 112, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 132, which may include training data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: receiving a first set of results during a user session in connection with a first query; storing (i) the first set of results received during the user session in a session cache associated with the user session and (ii) a first output generated from the first set of results in the session cache associated with the user session; subsequent to storing the first set of results, receiving a second query during the user session; in response to determining that a second query parameter of the second query corresponds to a first query parameter of the first query but fails to satisfy a match criterion: performing a cache lookup on the session cache to retrieve a matching result subset of the first set of results in lieu of retrieving the first output generated from the first set of results, wherein the matching result subset does not include a result corresponding to the first query parameter, and wherein it is determined that the second query parameter of the second query corresponds to the first query parameter of the first query but fails to satisfy the match criterion; and generating a second output based on (i) the matching result subset of the first set of results and (ii) a second result received in connection with the second query.

2. The method of the preceding embodiment, in response to determining that the second query parameter of the second query corresponds to the first query parameter of the first query and satisfies the match criterion: performing a second cache lookup on the session cache to retrieve the first output generated from the first set of results in lieu of generating the second output based on the first set of results, wherein it is determined that the second query parameter of the second query corresponds to the first query parameter of the first query and satisfies the match criterion.

3. The method of any of the preceding embodiments, wherein determining that the second query parameter of the second query fails to satisfy the match criterion further comprises: accessing a configuration profile indicating matching criteria that indicates whether to cache query results associated with query parameters; determining, based on the access of the configuration profile, that the second query parameter corresponds to a matching criterion indicating to not cache query results associated with the second query parameter; and in response to determining that the second query parameter corresponds to the matching criteria indicating to not cache the query results associated with the second query parameter, determining that the second query parameter of the second query fails to satisfy the match criterion.

4. The method of any of the preceding embodiments, wherein determining that the second query parameter of the second query fails to satisfy the match criterion further comprises: providing the second query parameter to a machine learning model configured to output a result indicating whether query parameters satisfy matching criteria; and receiving, based on the providing of the second query parameter to the machine learning model, a first result indicating that the second query parameter fails to satisfy the match criterion.

5. The method of the preceding embodiment, further comprising: obtaining training data for the machine learning model, wherein the training data comprises (i) historical query parameters and (ii) historical matching criteria indicating whether to cache query results associated with the historical query parameters; and providing the training data to the machine learning model during a training routine to train the machine learning model.

6. The method of any of the preceding embodiments, wherein generating the second output further comprises: providing the second query parameter to an application programming interface (API) during the user session; receiving the second result from the API in response to providing the second query parameter to the API; extracting one or more values associated with (i) the matching result subset of the first set of results and (ii) the second result; and providing the one or more extracted values to a second output function to generate the second output.

7. The method of any of the preceding embodiments, wherein the first set of results are received in response to providing one or more APIs to the first query.

8. The method of any of the preceding embodiments, wherein subsequent to determining that the second query parameter of the second query corresponds to the first query parameter of the first query but fails to satisfy the match criterion, the method further comprises: preventing storage of the second result received in connection with the second query during the user session in the session cache.

9. The method of the preceding embodiment, further comprising: preventing storage of the second output during the user session in the session cache.

10. The method of any of the preceding embodiments, wherein subsequent to determining that the second query parameter of the second query corresponds to the first query parameter of the first query and satisfies the match criterion, the method further comprises: storing the second result received in connection with the second query during the user session in the session cache.

11. The method of the preceding embodiment, further comprising: storing the second output during the user session in the session cache.

12. The method of any of the preceding embodiments, wherein the first set of results is an initial set of query results.

13. The method of any of the preceding embodiments, wherein the user session is a web session.

14. The method of any of the preceding embodiments, wherein the first query and the second query are user-specified queries.

15. The method of any of the preceding embodiments, wherein the first query and the second query are generated via one or more computing devices.

16. A tangible, non-transitory, machine-readable medium storing instructions that, when executed by a data processing apparatus, cause the data processing apparatus to perform operations comprising those of any of the foregoing method embodiments.

17. A system comprising: one or more processors; and memory storing instructions that, when executed by the processors, cause the processors to effectuate operations comprising those of any of the foregoing method embodiments.

What is claimed is:

1. A system for reducing usage of cache memory in connection with user queries, the system comprising:
one or more processors executing computer program instructions that, when executed, cause operations comprising:
receiving an initial set of query results during a web session in connection with an initial user-specified query;
storing (i) the initial set of query results received during the web session in a session cache associated with the web session and (ii) a first output generated from the initial set of query results in the session cache associated with the web session;
subsequent to storing the initial set of query results, receiving a subsequent user-specified query during the web session;
in response to determining that a subsequent query parameter of the subsequent user-specified query is for a same attribute as an initial query parameter of the initial user-specified query but fails to match the initial query parameter:
performing a cache lookup on the session cache to retrieve a matching result subset of the initial set of query results, in lieu of retrieving the first output generated from the initial set of query results, wherein the matching result subset does not include a query result corresponding to the initial query parameter; and
generating a second output based on (i) the matching result subset of the initial set of query results and (ii) a subsequent query result received in connection with the subsequent user-specified query.

2. The system of claim 1, wherein the instructions, when executed, further cause operations comprising:
in response to determining that the subsequent query parameter of the subsequent user-specified query is for the same attribute as the initial query parameter of the initial user-specified query and matches the initial query parameter:
performing a second cache lookup on the session cache to retrieve the first output generated from the initial set of query results, in lieu of generating a second output based on the initial set of query results.

3. A method comprising:
receiving a first set of results during a user session in connection with a first query;
storing (i) the first set of results received during the user session in a session cache associated with the user session and (ii) a first output generated from the first set of results in the session cache associated with the user session;
subsequent to storing the first set of results, receiving a second query during the user session;
in response to determining that a second query parameter of the second query corresponds to a first query parameter of the first query but fails to satisfy a match criterion:
performing a cache lookup on the session cache to retrieve a matching result subset of the first set of results, in lieu of retrieving the first output generated from the first set of results, wherein the matching result subset does not include a result corresponding to the first query parameter, and wherein it is determined that the second query parameter of the second query corresponds to the first query parameter of the first query but fails to satisfy the match criterion; and
generating a second output based on (i) the matching result subset of the first set of results and (ii) a second result received in connection with the second query.

4. The method of claim 3, further comprising:
in response to determining that the second query parameter of the second query corresponds to the first query parameter of the first query and satisfies the match criterion:
performing a second cache lookup on the session cache to retrieve the first output generated from the first set of results, in lieu of generating the second output based on the first set of results, wherein it is determined that the second query parameter of the second query corresponds to the first query parameter of the first query and satisfies the match criterion.

5. The method of claim 3, wherein determining that the second query parameter of the second query fails to satisfy the match criterion further comprises:
accessing a configuration profile indicating matching criteria that indicates whether to cache query results associated with query parameters;
determining, based on the access of the configuration profile, that the second query parameter corresponds to a matching criterion indicating to not cache query results associated with the second query parameter; and
in response to determining that the second query parameter corresponds to the matching criteria indicating to not cache the query results associated with the second query parameter, determining that the second query parameter of the second query fails to satisfy the match criterion.

6. The method of claim 3, wherein determining that the second query parameter of the second query fails to satisfy the match criterion further comprises:
providing the second query parameter to a machine learning model configured to output a result indicating whether query parameters satisfy matching criteria; and receiving, based on the providing of the second query parameter to the machine learning model, a first result indicating that the second query parameter fails to satisfy the match criterion.

7. The method of claim 6, further comprising:
obtaining training data for the machine learning model, wherein the training data comprises (i) historical query parameters and (ii) historical matching criteria indicating whether to cache query results associated with the historical query parameters; and
providing the training data to the machine learning model during a training routine to train the machine learning model.

8. The method of claim 3, wherein generating the second output further comprises:
providing the second query parameter to an application programming interface (API) during the user session;
receiving the second result from the API in response to providing the second query parameter to the API;
extracting one or more values associated with (i) the matching result subset of the first set of results and (ii) the second result; and
providing the one or more extracted values to a second output function to generate the second output.

9. The method of claim 3, wherein the first set of results are received in response to providing one or more APIs the first query.

10. The method of claim 3, wherein subsequent to determining that the second query parameter of the second query corresponds to the first query parameter of the first query but fails to satisfy the match criterion, the method further comprises:
preventing storage of the second result received in connection with the second query during the user session in the session cache.

11. The method of claim 10, further comprising:
preventing storage of the second output during the user session in the session cache.

12. The method of claim 3, wherein subsequent to determining that the second query parameter of the second query corresponds to the first query parameter of the first query and satisfies the match criterion, the method further comprises:
storing the second result received in connection with the second query during the user session in the session cache.

13. The method of claim 12, further comprising:
storing the second output during the user session in the session cache.

14. One or more non-transitory, computer-readable media storing instructions that, when executed by one or more processors, cause operations comprising:
storing (i) a first set of results received during a user session, in a session cache associated with the user session, in connection with a first input and (ii) a first output generated from the first set of results in the session cache associated with the user session;
subsequent to storing the first set of results, receiving a second input during the user session;
in response to determining that a second input parameter of the second input corresponds to first input parameter of the first input but fails to satisfy a match criterion:
accessing the session cache to retrieve a matching result subset of the first set of results, in lieu of retrieving the first output generated from the first set of results, wherein the matching result subset does not include a result corresponding to the first input parameter; and
generating a second output based on (i) the matching result subset of the first set of results and (ii) a second result received in connection with the second input.

15. The media of claim 14, the instructions further causing operations comprising:
in response to determining that the second input parameter of the second input corresponds to the first input parameter of the first input and satisfies the match criterion:
accessing the session cache to retrieve the first output generated from the first set of results, in lieu of generating the second output based on the first set of results.

16. The media of claim 14, wherein determining that the second input parameter of the second input fails to satisfy the match criterion further comprises:
accessing a configuration profile indicating matching criteria that indicates whether to cache results associated with input parameters;
determining, based on the access of the configuration profile, that the second input parameter corresponds to a matching criterion indicating to not cache results associated with the second input parameter; and
in response to determining that the second input parameter corresponds to the matching criteria indicating to not cache the results associated with the second input parameter, determining that the second input parameter of the second input fails to satisfy the match criterion.

17. The media of claim 14, wherein determining that the second input parameter of the second input fails to satisfy the match criterion further comprises:
providing the second input parameter to a machine learning model configured to output a result indicating whether input parameters satisfy matching criteria; and
receiving, based on the providing of the second input parameter to the machine learning model, a first result indicating that the second input parameter fails to satisfy the match criterion.

18. The media of claim 14, wherein subsequent to determining that the second input parameter of the second input corresponds to the first input parameter of the first input but fails to satisfy the match criterion, the operations further comprising:
preventing storage of the second result received in connection with the second input during the user session in the session cache.

19. The media of claim 14, wherein subsequent to determining that the second input parameter of the second input corresponds to the first input parameter of the first input and satisfies the match criterion, the instructions further cause operations comprising:
storing the second result received in connection with the second input during the user session in the session cache.

20. The media of claim 19, the instructions further causing operations comprising:
storing the second output during the user session in the session cache.

* * * * *